United States Patent
Schlecht et al.

(10) Patent No.: US 6,598,929 B2
(45) Date of Patent: Jul. 29, 2003

(54) WINDUP WINDOW SHADE WITH A CENTERING DEVICE FOR THE TRACTION ROD

(75) Inventors: Werner P. Schlecht, Vaihingen/Enz (DE); Herbert Walter, Ebersbach (DE)

(73) Assignee: Bos GmbH & Co. KG, Ostfildern (DE)

( * ) Notice: Subject to any disclaimer, the term of this patent is extended or adjusted under 35 U.S.C. 154(b) by 0 days.

(21) Appl. No.: 09/989,466

(22) Filed: Nov. 21, 2001

(65) Prior Publication Data

US 2002/0060469 A1 May 23, 2002

(30) Foreign Application Priority Data

Nov. 22, 2000 (DE) .......................... 100 57 760

(51) Int. Cl.[7] .............. B60J 11/20; B60J 3/02; A47G 5/02
(52) U.S. Cl. ............ 296/97.4; 296/97.7; 296/97.8; 296/97.9; 160/265; 160/370.22
(58) Field of Search ............... 296/97.4, 97.7, 296/97.8, 97.9, 97.11; 160/265, 370.22

(56) References Cited

U.S. PATENT DOCUMENTS

| 2,132,986 | A | * | 10/1938 | Julien |
| 2,255,822 | A | * | 9/1941 | Schunk |
| 2,594,386 | A | * | 4/1952 | Blessen |
| 4,758,041 | A | | 7/1988 | Labeur |
| 4,836,263 | A | * | 6/1989 | Ament ................. 160/68 |
| 4,887,660 | A | * | 12/1989 | Kraus ................. 160/265 |
| 5,000,506 | A | * | 3/1991 | Abu-Shumays et al. ... 296/97.8 |
| 5,033,527 | A | * | 7/1991 | Ouvrard et al. ........... 160/310 |
| 5,067,546 | A | * | 11/1991 | Jeuffray et al. ........... 160/23.1 |
| 5,201,810 | A | | 4/1993 | Ojima et al. |
| 5,404,926 | A | * | 4/1995 | Ojima et al. ............ 160/280 |
| 5,551,744 | A | * | 9/1996 | Liao .................... 296/97.8 |
| 5,560,668 | A | * | 10/1996 | Li ...................... 296/97.8 |
| 5,632,317 | A | * | 5/1997 | Krupke et al. .......... 160/265 |
| 6,047,762 | A | * | 4/2000 | Anderson ............ 160/370.22 |
| 6,086,133 | A | | 7/2000 | Alonso |
| 6,095,231 | A | * | 8/2000 | Hahn ................ 160/370.22 |
| 6,227,601 | B1 | * | 5/2001 | LaFrance .............. 296/97.8 |
| 6,276,429 | B1 | * | 8/2001 | Chen .................. 160/231.1 |
| 2001/0017194 | A1 | * | 8/2001 | Schlecht et al. ...... 160/370.22 |
| 2001/0022218 | A1 | * | 9/2001 | Schlecht et al. ...... 160/370.22 |
| 2002/0033616 | A1 | * | 3/2002 | Schlecht et al. ......... 296/97.4 |

FOREIGN PATENT DOCUMENTS

| DE | 36 08 927 | 9/1987 |
| DE | 36 12 165 | 10/1987 |
| DE | 196 19 474 | 11/1997 |
| DE | 299 21 859 | 8/2000 |

* cited by examiner

*Primary Examiner*—D. Glenn Dayoan
*Assistant Examiner*—H. Gutman
(74) *Attorney, Agent, or Firm*—Venable; Norman N. Kunitz

(57) ABSTRACT

A windup window shade for motor vehicles has a rotatably seated windup shaft, on which a window shade web is fastened by an edge. The other edge is fastened on a traction rod, whose ends are guided in guide rails. The distance between the guide rails changes very greatly, viewed in the direction of movement of the window shade web, because of which the length of the traction rod can be changed in a telescope-like manner. It is composed of a center element and two end elements, wherein it is provided with the aid of a centering device that the center element always remains centered in respect to the end elements.

15 Claims, 5 Drawing Sheets

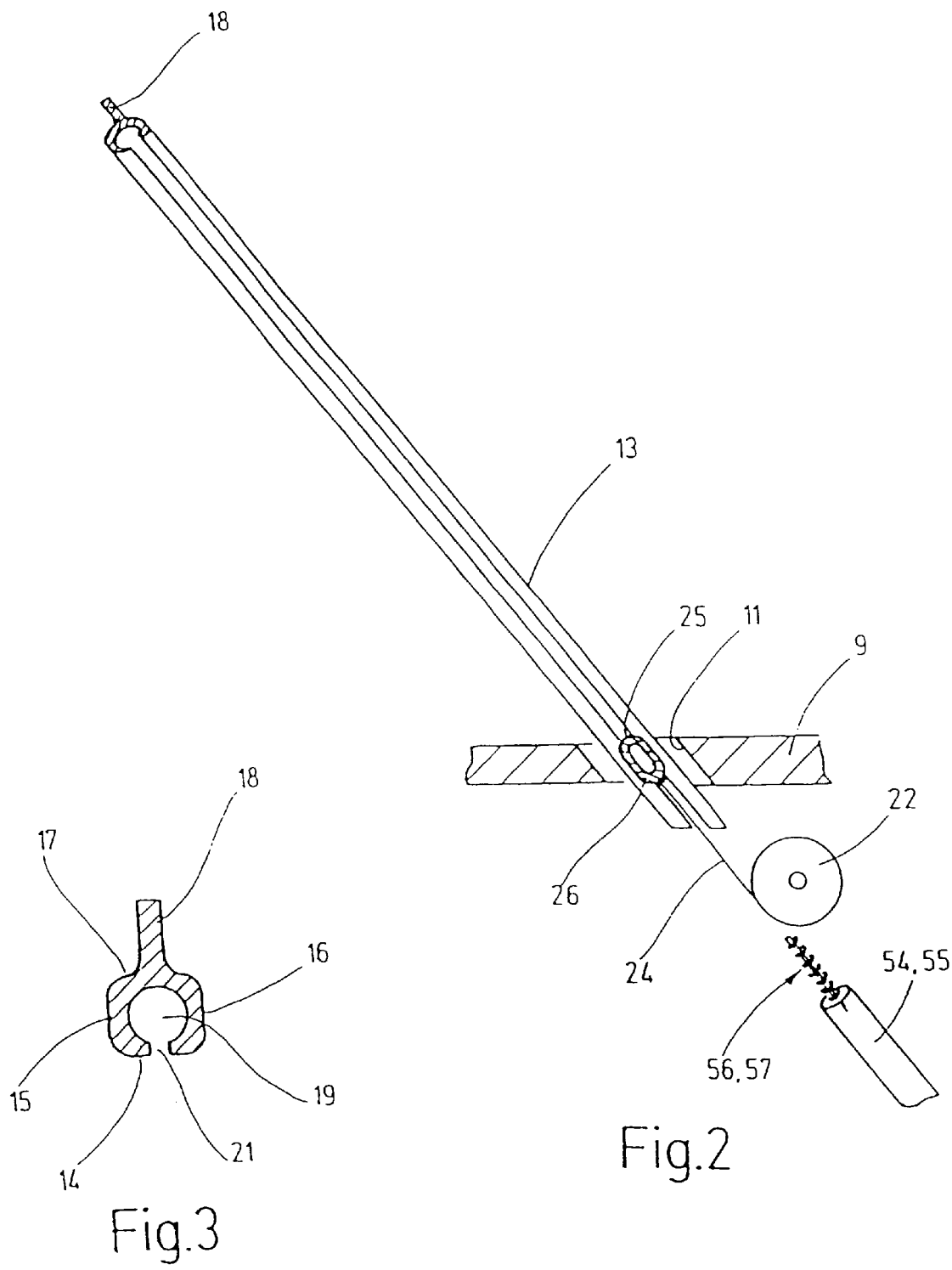

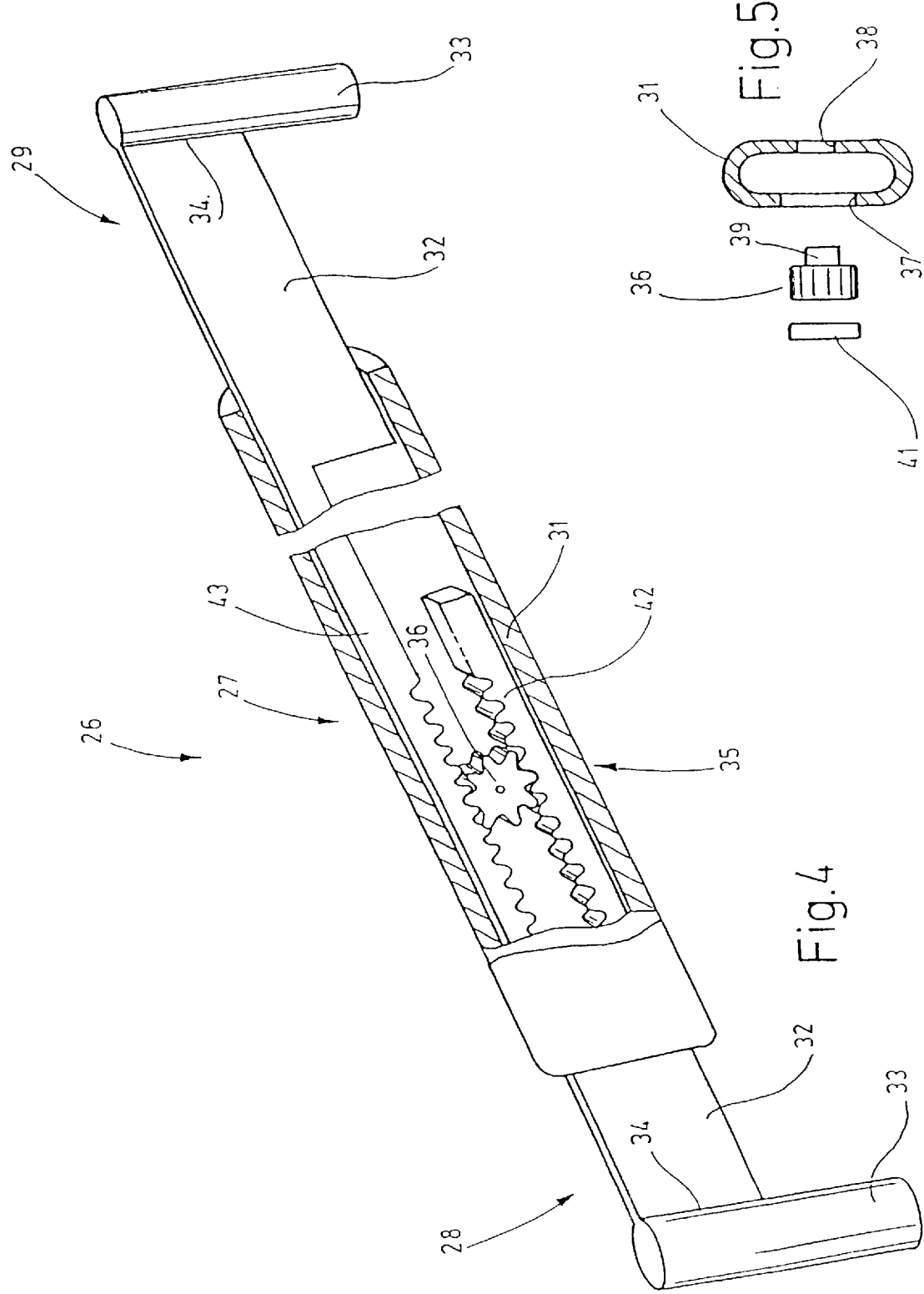

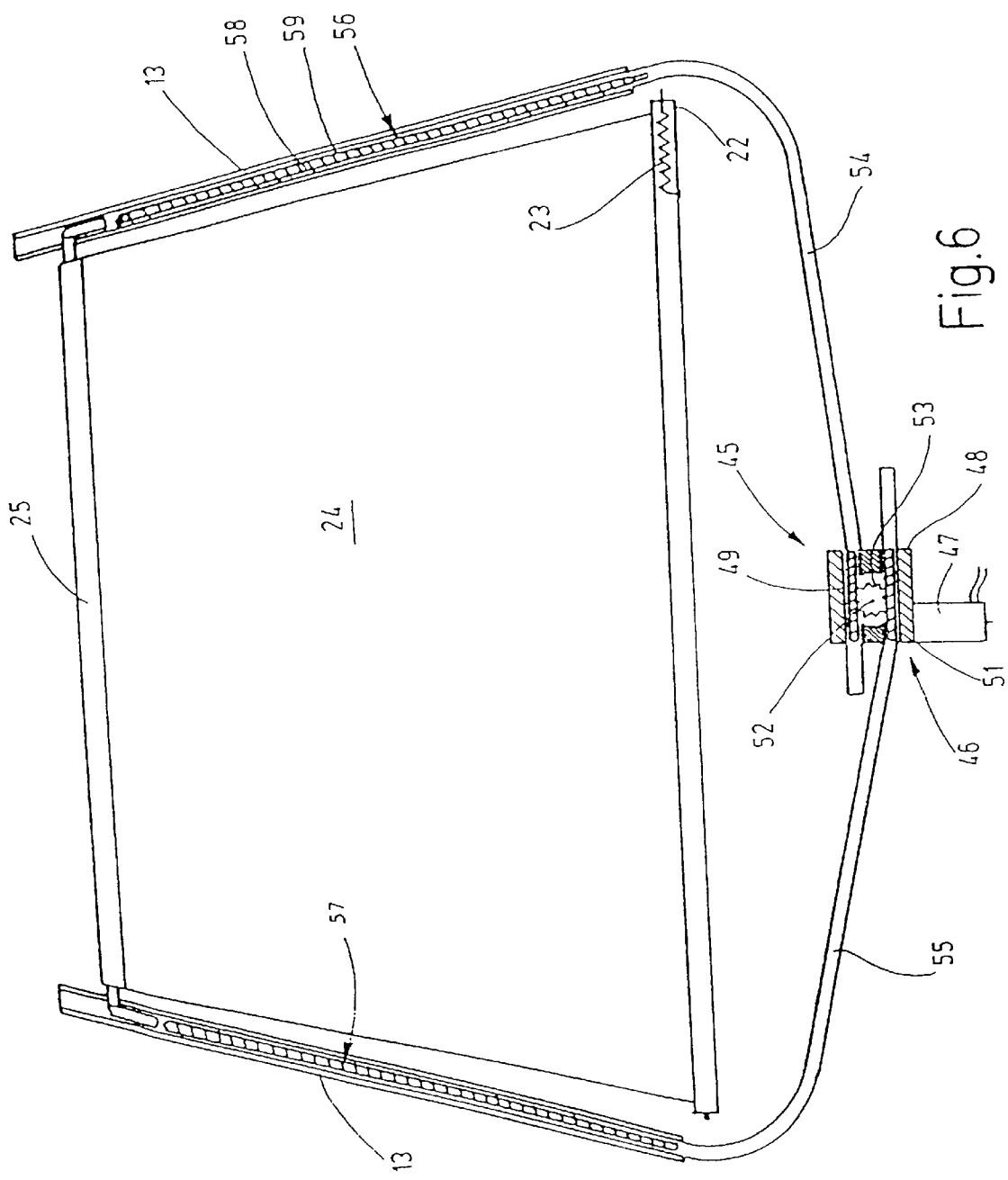

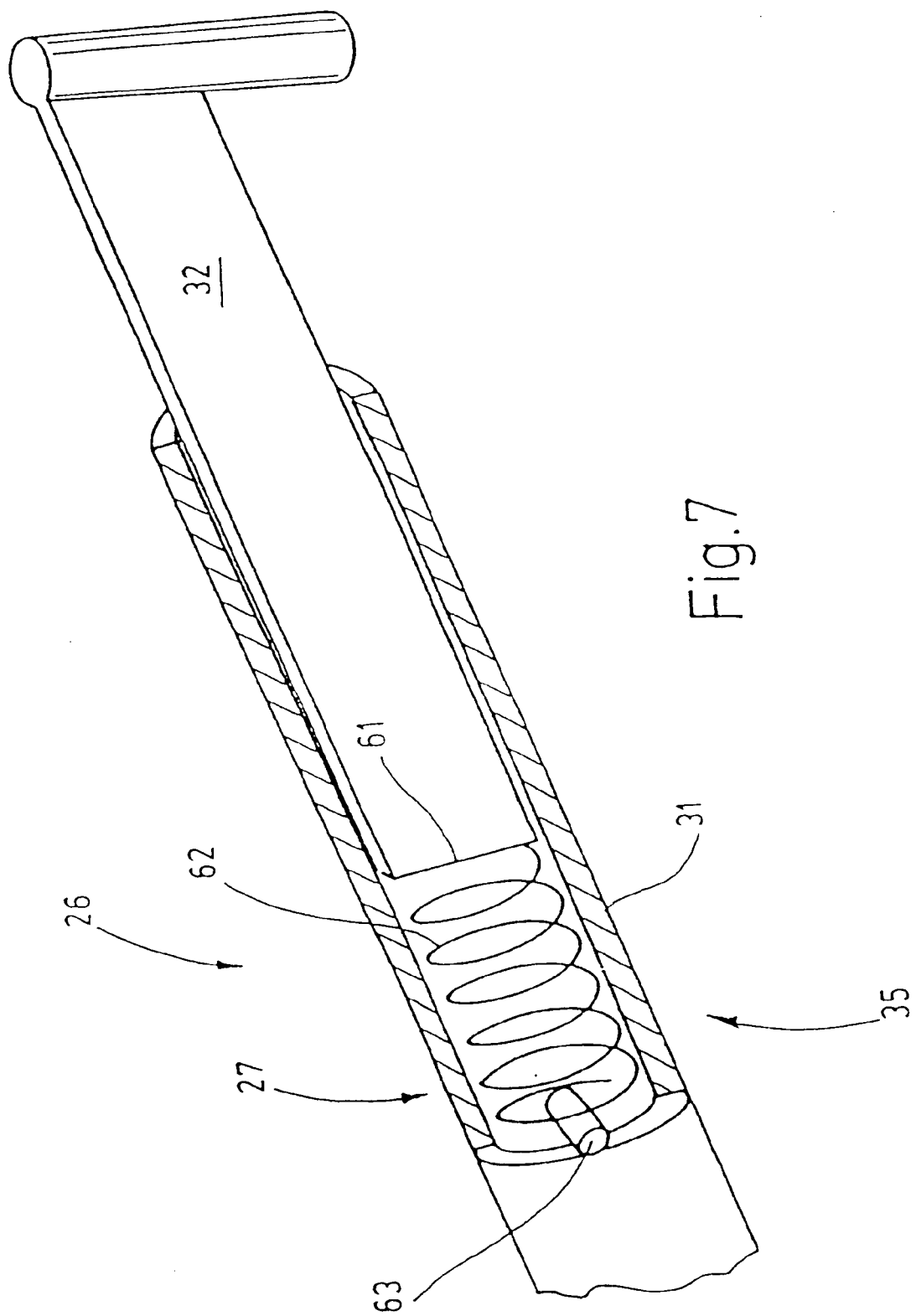

WINDUP WINDOW SHADE WITH A CENTERING DEVICE FOR THE TRACTION ROD

BACKGROUND OF THE INVENTION

Modern automobile body shapes are distinguished by relatively large window areas. Because of strong sunlight, the large window areas result in considerable heat generation in the interior of the vehicle and, in connection with vehicles with air conditioning, this extensive heat For this reason, motor vehicles are increasingly equipped with windup window shades.

In this connection it is known to attach two guide rails laterally next to the window, in which the end of a traction rod of the window shade web is guided. The length of the traction rod is adjustable in order to be able to accommodate various window widths. Actuation takes place by means of thrust members running in the guide rails.

The windows in front of which such windup window shades are arranged generally have an approximately trapezoidal shape. The shape is a result of the shape of the vehicle body, wherein the roof is relatively strongly recessed in relation to the mid-section of the vehicle. When the guide rails extend along the lateral edges of the rear window, the distance which the traction rod must bridge is unavoidably changed when it is moved along the guide rails.

Therefore the traction rod of the known windup window shades is made in three sections and consists of a center element, whose length corresponds to the width of the window shade web shape at the appropriate edge, and two end elements, which can be moved in a telescope-like manner in respect to the center element.

The center element and the end elements are pushed together over sliding connections, which necessarily cause a certain minimum amount of friction.

The friction differs at the two end elements. A differential force is created during the retraction and extension of the end elements, which is more or less strong and directed toward one of the two lateral guide rails. The window shade web is transversely warped and causes waves and folds. If the differential force increases because the warping increases, the transverse stiffness of the window shade web might possibly result in sufficient centering.

As a rule, such blinds are extended from the wider edge in the direction of the narrower edge, i.e. in the direction toward the roof. The center element is pushed into a more or less centered position when, it pushes against a guide rail. However, no use can be made of this centering during retraction, so that the window shade web is possibly wound up more or less lopsided, and over time the created folds or waves are imprinted on the wound-up body.

Based on the foregoing it is the object of the invention to further improve a windup window shade of the above mentioned type in such a way that there is no danger of decentering the edge of the window shade web, which moves in front of the window surface during retraction and extension.

SUMMARY OF INVENTION

In accordance with the invention, the above object generally is attained by a windup window shade for regulating the entry of light through a window into the interior of a motor vehicle, comprising; at least one windup shaft, which is rotatably seated; at least one window shade web, which is fastened by one edge on the windup shaft; at least one pair of guides, each of which extends laterally beside the extended window shade web, and each of which contains at least one guide groove; a length-adjustable traction rod, which is connected with an edge remote from the windup shaft and is composed of a center element and two end elements, with the end elements being guided in the guide grooves; a centering device, which, at least approximately, centers the center element with respect to the end elements; and, a drive mechanism for moving the traction rod along the guides and or rotating the windup shaft.

The windup window shade of the invention is provided with a centering device which assures that the center element of the traction rod remains at least approximately centered.

Two options are possible for the centering device. One option operates in accordance with the principle of a differential gearing, while the other variation provides springs, which assure a floating centering.

In the case of the differential gearing or drive, the movement of one end element in relation to the center element is transmitted in the opposite direction to the other end element, wherein the amount of the length of travel displacement equals the length of travel displacement of the first-mentioned end element. Regardless of which one is actuated, the two end elements are in this way pushed oppositely back and forth by the same amount in respect to the center element. In turn, this results in a forced centering of the center element if the end elements move in respect to each other.

The centering device with the aid of springs acts floatingly. One end of the springs is supported on the center element and assures that the center element is floatingly centered in respect to the end elements. The center element will be displaced in the linear direction until the force exerted by the two springs is equal. If the springs have a comparatively steep characteristic curve, they are in a position to center the center element with sufficient accuracy even if the frictional forces of the end elements in respect to the center element differ.

Which one of the two solutions is preferred is primarily a function of the installation conditions and the extent of the trapezoidal shape, i.e. the length which the end elements must travel. In connection with a great length of travel, the differential gearing arrangement possibly has advantages, while the spring solution is easier to implement.

If a differential gearing is used as the centering device, the differential gearing can operate interlockingly, or also by frictional connection. The frictionally-connected embodiment possibly does not operate as accurately as the interlocking arrangement, but can be assembled somewhat more easily.

In each case it is advantageous if the center element is formed from a tube, preferably a profiled tube, because the end elements are displaceable in the profiled tube in a manner fixed against relative rotation. The profiled tube keeps the window shade web separate from the centering device, and at the same time protects the centering device.

The guide means preferably are guide rails containing a guide groove. But the solution in accordance with the invention can also be employed in connection with windup window shades wherein the traction rod runs on rod-shaped guide rails and has eyes at the ends.

A spring drive and an electric motor are preferably provided for moving the windup window shade. Also preferred is the seating of the spring drive in the windup shaft, while the electric motor drives the traction rod. With this arrangement the window shade web is forcibly and without any increased outlay kept stretched between the windup shaft and the traction rod. But the other driving means is also conceivable, wherein the traction rod is biased in the direction of the extended position with the aid of the springs, while the windup shaft is driven by the electric motor.

The window shade web itself preferably consists of a woven material or a perforated and dyed plastic foil.

Further embodiments of the invention are disclosed and discussed. It is intended here that also those combinations of characteristics are considered to be within the scope of the invention, even if there is no explicit exemplary embodiment.

BRIEF DESCRIPTION OF THE DRAWINGS

Exemplary embodiments of the subject of the invention are represented in the drawings.

DETAILED DESCRIPTION OF THE INVENTION

Figure 1:
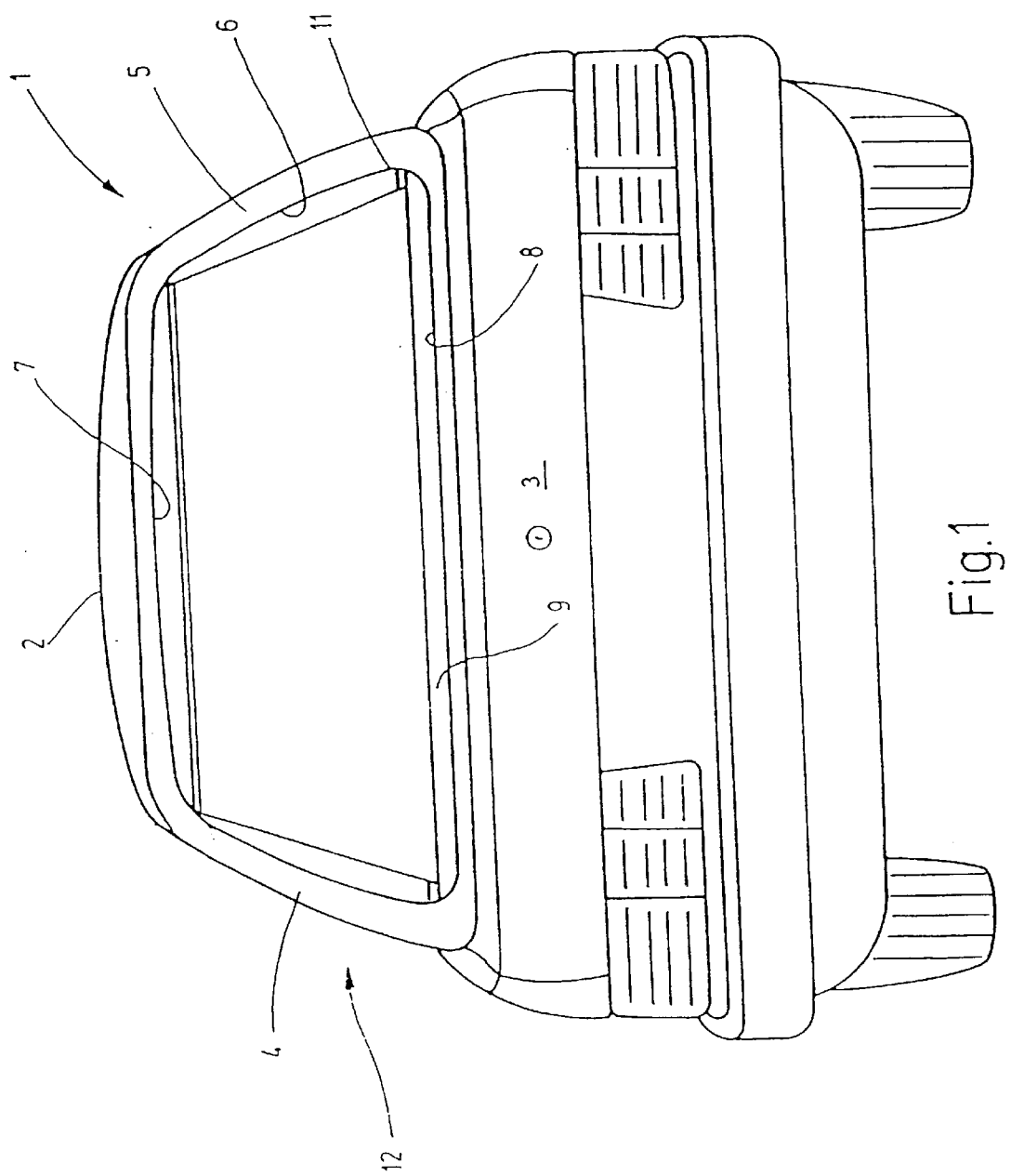
FIG. 1, a passenger car in a rear view, showing a rear window windup shade in accordance with the invention in the extended state, FIG. 2, the basic structure of the rear window windup shade in accordance with FIG. 1, FIG. 3, the guide rail of the rear window windup shade in accordance with FIG. 1 in a cross-sectional view, FIG. 4, the guide rail of the rear window windup shade in a perspective sectional representation, FIG. 5, the traction rod in accordance with FIG. 4 in cross section, cut along the axis of the pinion gear, FIG. 6, the drive mechanism of the rear window windup shade in accordance with FIG. 1 in a simple schematic representation, and FIG. 7, a further exemplary embodiment of the traction rod in a simple sections representation.

In a schematic representation, FIG. 1 shows a rear view of a passenger car 1, having a roof 2, a trunk 3, as well as two C-pillars 4 and 5. A rear window opening 6, which is bordered at the top by a rear edge 7 of the roof and on the bottom by a lower window edge 8, is located between the two C-pillars 4 and 5. A rear window pane is seated in the rear window opening 6, glued in in a known manner, for example by means of a window rubber strip.

A rear window shelf 9 is located in the interior of the passenger car 1 in front of the rear window, which horizontally extends between the lower window edge 8 and the backrest of a rear seat, not visible in the drawing. A straight outlet slit 11 extends in the rear window shelf 9.

The outlet slit 11 is a part of a rear window windup shade 12, whose basic structure is shown, greatly schematized, in a lateral view in FIG. 2.

The rear window windup shade 12 has two guide rails 13, which are fastened next to the lateral edges of the rear window opening 6 on both C-pillars 4 and 5. Because of the cut-open basic representation, only one guide rail 13, which for example is fastened on the C-pillar 5, can be seen in FIG. 2.

The guide rail 13 has the cross-sectional profile represented in FIG. 3. It is essentially square in cross section with rounded corners and is bordered by a front 14, two lateral walls 15 and 16, as well as by a back 17. A strip-like fastening flange 18 extends from the back 17, with the aid of which the guide rail 13 is to be attached to appropriate parts of the vehicle body.

A guide groove 19, which is circular in cross section and open via a slit 21 toward the front 14, is contained in the guide rail 13.

The guide rail 13 is for example made of an extruded aluminum profile.

Since the slit 21 is narrower than the diameter of the circular section of the guide groove 19, an undercut groove is created, which is suitable for protecting a linearly shaped thrust member against kinking and, by means of an appropriate cross section, to prevent the thrust member of an appropriate diameter from passing through the slit 21 to the outside.

The guide rails 13 are bent in respect to several axes so that they follow the contour of the window edge without becoming visible in the window itself. The guide rails 13 are arranged in such a way that the grooves 19 open in the direction toward each other.

As FIG. 2 shows, the guide rails 13 extend downward through the slit 11 as far as below the rear window shelf 9.

A windup shaft 22 is rotatably seated below the rear window shelf 9, as schematically represented in FIG. 2. The seating devices are not shown, because they are not required for understanding the invention.

The windup shaft 22 is tube-shaped and houses a spring drive 23, which is schematically shown in FIG. 6. The spring drive 23 consists of a helical spring, one end of which is fixed in place in the interior of the windup shaft 22 and the other end of which is anchored on one of the seating brackets, not represented, for seating the windup shaft 22.

A window shade web 24, whose shape is a trapezoid approximation of the contour of the rear window 6, is fastened with one edge on the windup shaft 22. The edge remote from the windup shaft 22 is formed into a hose-shaped loop 25, in which a traction rod 26 is seated. The traction rod 26 is represented in detail in FIG. 4.

A center element 27, as well as two end elements 28 and 29, which can be moved in a telescope-like manner in respect to the center element 27, are essentially parts of the traction rod 26.

The center element 27 is an oval tube 31 of constant cross section when viewed over its respective length. The length of the tube 31 corresponds to the length of the hose-shaped loop 25, and therefore to the corresponding edge of the window shade web 24.

The end element 28 has an L-shaped form and is composed of an arm 32 and a guide element 33. The arm 32 has a cross section of such a shape that it can be displaced, free of play to a great extent, in the interior of the tube 31. An outer end 34 makes a transition into the guide element 33, whose cross section is matched to the circular part of the guide groove 19, while the width of the arm 32 corresponds to the width of the slit 21.

The two end elements 28 and 29 are identically embodied in respect to the arm 32 and the guide element 33.

A centering device 35 in the form of a differential gearing is located approximately in the center of the tube 31. A pinion gear 36, which is freely rotatable around an axis extending perpendicularly in respect to the large axis of the profiled cross section of the tube 31, is part of the centering device 35.

The tube 31 has two bores 37 and 38, which are aligned with each other, at the location of the pinion gear 36. The bore 37 is slightly larger than would correspond to the tip circle or exterior diameter of the pinion gear 36, while the bore 38 aligned therewith is matched in the oppositely located lateral wall of the tube 31 to an axle journal 39, which is a one-piece component of the pinion gear 36 and extends from the pinion gear 36, as indicated. The width of the pinion gear 36 corresponds to the clearance of the tube 31.

In the assembled state, the axle journal 39 rests freely rotatable with little play in the bore 38. To achieve this, the pinion gear 36 was inserted through the bore 37 with the axle journal 39 leading. After the pinion gear 36 has been inserted, the bore 37 is closed by means of a pressed-in disk-shaped cover 41.

The centering device furthermore comprises two toothed racks 42 and 43, which are in meshed engagement with the pinion gear 36. One of the two toothed racks extends, as indicated, below the pinion gear 36, while the other toothed rack 43 is guided above it in the tube 31. As indicated, the toothed rack 43 makes a transition at one end in one piece into the arm 32 of the end element 29, while the other toothed rack makes a transition into the arm 32 of the end element 28 in respectively the same way.

The manner of functioning and operating of the centering device 35 can be easily observed.

If the end element 29 is displaced in the linear direction in relation to the tube 31, the pinion gear 36 is caused to rotate via the toothed rack 43. The rotation transfers the movement in an opposite direction to the toothed rack 42, so that the toothed rack 42 is displaced by the same amount, but in the opposite direction. The result of this is that the end element 28 performs a movement in relation to the centering element 35 which has the same length of travel as the movement of the end element 29, but in the opposite direction. Now, if in the initial state the centering element is seated exactly centered between the two guide elements 33, this exact centering is also maintained if one of the two end elements 28 or 29 is displaced. Conversely, the centering of the centering element 35 is also maintained if the two end elements 28 and 29 are moved toward or away from each other by externally acting forces.

It is understood that the length of the toothed racks 42, 43 corresponds to the required length of travel, and that the portion of the arms 32 which is free of the toothed racks is dimensioned in such a way that a sufficient telescope-like guidance in the tube 31 is assured, which is free of jamming over the entire operational length of travel.

For the sake of completeness, the entire structure and operation of the windup window shade 12 will be explained by means of FIG. 6.

A drive mechanism 45, which is represented in a greatly schematized manner in FIG. 6, is provided for extending the window shade web 24. To simplify the representation and to make the understanding of the invention easier, the two lateral guide rails 13 are represented in section in FIG. 6. The two guide grooves 19 open in the direction toward each other.

A gear motor 46 is a part of the drive mechanism 45, which is composed of a permanently excited direct current (d.c.) motor 47 and a gear housing 48. Two guide channels 49 and 51 are contained parallel to each other in the gear housing, between which an output gear wheel 53 is provided on an output shaft 52. The output gear wheel 53 can be selectively put into motion in both directions of rotation by the output shaft 52, which is connected with it, fixed against relative rotation.

A guide tube 54 runs from the guide channel 49 to the lower end of the guide groove 19 in the right guide rail 13.

At the left end, the guide channel 51 is connected via a guide tube 55 with the lower end of the guide groove 19 in the left guide rail 13.

A flectionally elastic thrust member 56, or 57, extends through the guide channel 49, as well as through the guide channel 51. The respectively unused portion of the thrust members 56, 57 is pushed back into reservoir tubes, which extend from the respectively other end of the guide channels 49, 51.

The two thrust members 56 and 57 are identically constructed. Each consists of an elastically flexible core 58, which has one or several ribs 59 on its exterior, which form a single-or-multi-start screw thread there. The ribs 59 protrude radially and run helically over the cylindrical core 58 from one end of the thrust member to the other end. The output gear wheel 53 has teeth which can enter between the grooves formed by the ribs 59. In this way the output gear wheel 53 is interlockingly coupled with the thrust members 56 and 53.

The mode of functioning of the described rear window windup shade is as follows:

In the position of rest, the windup shaft 22 has been rotated by the action of the spring drive 23 into a position in which the window shade web 24 is wound up. In this position the hose-like loop 25 is located in the outlet slit 11, as can be seen in FIG. 2. The traction rod 26 with the guide elements 33 is located in the vicinity of the lower ends of the two guide rails 13, but without the guide elements 33 having been released out of the associated guide grooves.

At the same time the two ends of the thrust members 56 and 57 are spaced apart from the respective guide elements 33.

If, starting from this position of the rear windup window shade 12, in which the entry of light into the vehicle interior is not hampered at all, the user would like to create a shading effect, he would extend the window shade web 24. The window shade web 24 reduces the entry of light, but without stopping it completely. For this purpose the window shade web 24 is made, for example, of an open chain weave, or a perforated plastic foil, which is colored black.

To extend the window shade web 24, the gear motor 46 is put into operation in a direction of rotation in which it moves the thrust member 56 toward the right through the guide groove 19. Since the two thrust members 56 and 57 mesh with the output gear wheel 53 at diametrically opposite ends, the thrust member 57 is simultaneously pushed forward toward the left through the guide groove 19 of the left guide rail 13. After a short distance over the advance path, the free ends of the two thrust members 56 and 57 come into engagement with the lower ends of the guide elements 33 of the two end elements 28 and 29, and in the further process push the end elements 28 and 29 in the direction toward the upper end of the two guide rails 13.

Since the distance between the guide rails changes, the arms 32 of the end elements 28, 29 simultaneously dip telescope-like into the tube 31 of the traction rod 26 contained in the loop 25. Because of the centering device 35, the centered position of the center element 27 is maintained. The window shade web 24 does not show wave formations, because no transverse forces can occur in the window shade web.

As soon as the end position has been reached, the gear motor 46 is stopped. The extended end position is represented in FIG. 6.

The gear motor 46 is self-locking and arrests the thrust members 56 and 57 in their respectively reached positions.

The switch-off of the gear motor 46 is performed with the aid of limit stop switches, or in that the guide elements or members 33 run up against stops, so that a blocking current occurs, which is evaluated in an electronic device and leads to switch-off.

The window shade web 24 is now held stretched between the traction rod 26 and the windup shaft 22.

For retraction, the gear motor 46 is started in the opposite direction of rotation, so that the two thrust members 56 and 57 are moved downward out of the associated guide rails 13. The traction rod 26 simultaneously moves downward, because the window shade web 24 is constantly kept under tension by the action of the spring drive 23 of the windup shaft 22.

Another version of the centering device 35 is represented in FIG. 7. Here, the same reference symbols as before are used for components who correspond in their functions, without providing another explanation.

FIG. 7 shows one end of the traction rod 26, wherein portions of the center element 27 are cut open in the longitudinal direction. As before, the arm 32 can be linearly displaced telescope-like in the tube 31, which constitutes the center element 27. It terminates at a blunt end 61 inside the tube 31.

The centering device 35 acts floatingly and comprises a helical compression spring 62 housed in the tube 31. One end of it is supported on the blunt end 61, and the other end on a transverse bolt 63, which has been inserted in corresponding aligned bores of the tube 31, as shown.

The other, broken-away end of the traction rod 26 is embodied in the same way, therefore also comprises a helical compression spring 62, a bolt 63 and a correspondingly designed end element 28 or 29.

The two helical compression springs 62 at the two ends of the tube 31 are identical, and the distances at which the bolts 63 serving as abutments are from the adjoining front end of the tube 31 are identical. Because of this the center element 27 is floatingly centered between the two end elements 28 and 29 when the latter are forced by the guide rails 13 to be at a defined distance. With an appropriate steepness of the characteristic spring curves, at a given friction of the end elements 28 and 29 in the center element 27 only a comparatively small decentering remains in the worst case. Decentering is so small that no warping of the window shade web 24 could be observed. As to the rest, the functioning is as described above.

A windup window shade for motor vehicles has a rotatably seated windup shaft, on which a window shade web is fastened by an edge. The other edge is fastened on a traction rod, whose ends are guided in guide rails. The distance between the guide rails changes very greatly, viewed in the direction of movement of the window shade web, because of which the length of the traction rod can be changed in a telescope-like manner. It is composed of a center element and two end elements, wherein it is provided with the aid of a centering device that the center element always remains centered in respect to the end elements.

What is claimed is:

1. A windup window shade for regulating the entry of light through a window into the interior of a motor vehicle, comprising:

at least one windup shaft, which is rotatably seated, at least one window shade web, which is fastened by one edge on the windup shaft, at least one pair of guide rails, each of which extends laterally beside the window shade web when extended, and each of which contains at least one guide groove, a length-adjustable traction rod, which is connected with and edge remote from the windup shaft and is composed of a center element and two end elements, of which the end elements are guided in the guide grooves, a centering device, formed as a differential gearing which, at least approximately, centers the center element with respect to the end elements, and a drive mechanism for moving the traction rod along the guide rails and for rotating the windup shaft.

2. The window windup shade in accordance with claim 1, wherein the center element is a tube.

3. The window windup shade in accordance with claim 2, wherein the tube is a profiled tube.

4. The window windup shade in accordance with claim 1, wherein the end elements are guided in a telescope-like manner in the center element.

5. The window windup shade in accordance with claim 1, wherein the differential gearing is an interlocking or friction-connected gearing.

6. The window windup shade in accordance with claim 1, wherein the differential gearing comprises a gear wheel seated in the center element, as well as two toothed racks, which mesh with the gear wheel and each of which is connected with one of the end elements.

7. The window windup shade in accordance with claim 1, wherein each said guide groove is an undercut guide grooves.

8. The window windup shade in accordance with claim 1, wherein a spring drive is assigned to the windup shaft, which biases the windup shaft in the windup direction.

9. The window windup shade in accordance with claim 1, wherein for moving the traction rod, the drive mechanism comprises two drive members.

10. The window windup shade in accordance with claim 9, wherein the drive members are flexible linearly-shaped thrust members, which are guided, secure from kinking, between a gear motor forming said drive mechanism and the respective guide groove.

11. The window windup shade in accordance with claim 10, wherein the thrust members are approximately cylindrical structures, which are provided with teeth on the exterior, which extend at a constant pitch over respective lengths of the cylindrical structures.

12. The window windup shade in accordance with claim 11, the teeth are formed by a rib, which extends helically on the exterior.

13. The window windup shade in accordance with claim 10, wherein the thrust members act interlockingly together with the gear motor.

14. The window windup shade in accordance with claim 1, wherein the drive mechanism comprises a gear motor.

15. The window windup shade in accordance with claim 1, wherein the window shade web consists of a woven material or a perforated foil.

* * * * *